United States Patent
Kim

(10) Patent No.: US 7,099,658 B2
(45) Date of Patent: Aug. 29, 2006

(54) MOBILE COMMUNICATION TERMINAL HAVING REMOTE-CONTROLLED CAMERA AND PHOTOGRAPHING METHOD USING THE SAME

(75) Inventor: Kwang-Uk Kim, Anyang-shi (KR)

(73) Assignee: Samsung Electronics Co., Ltd., (KR)

( * ) Notice: Subject to any disclaimer, the term of this patent is extended or adjusted under 35 U.S.C. 154(b) by 142 days.

(21) Appl. No.: 10/800,114

(22) Filed: Mar. 12, 2004

(65) Prior Publication Data

US 2004/0185925 A1    Sep. 23, 2004

(30) Foreign Application Priority Data

Mar. 18, 2003    (KR) .................. 10-2003-0016816

(51) Int. Cl.
*H04M 3/42*    (2006.01)
*H04B 1/38*    (2006.01)
*H04N 5/225*    (2006.01)

(52) U.S. Cl. .................. 455/415; 455/567; 455/557; 348/375; 348/376

(58) Field of Classification Search .............. 455/415, 455/567, 557; 348/375, 376
See application file for complete search history.

(56) References Cited

FOREIGN PATENT DOCUMENTS

JP    2003264616 A    *    9/2003

OTHER PUBLICATIONS

Patent Abstract of Japan, Electronic Translation: JP 2003-264616.*
Patent Abstracts of Japan: JP 2003-287798; JP 2003-219043.*

* cited by examiner

*Primary Examiner*—Lester G. Kincaid
*Assistant Examiner*—Marisol Figueroa
(74) *Attorney, Agent, or Firm*—Dilworth & Barrese LLP

(57) ABSTRACT

A photographing method is disclosed that uses a mobile communication terminal having a camera, with the method including steps of entering a remote-control photographing mode, receiving a predetermined call, determining whether or not a telephone number of the predetermined call corresponds to a telephone number stored in a memory, and operating the camera to take a photograph when the telephone number of the predetermined call corresponds to the telephone number stored in the memory. The photographing is carried out by remote-controlling the camera accommodated in the mobile communication terminal.

8 Claims, 4 Drawing Sheets

MOBILE COMMUNICATION TERMINAL HAVING REMOTE-CONTROLLED CAMERA AND PHOTOGRAPHING METHOD USING THE SAME

PRIORITY

This application claims priority to an application entitled "Mobile Communication Terminal Having Remote-controlled Camera and Photographing Method By Using The Same" filed in the Korean Industrial Property Office on Mar. 18, 2003 and assigned No. 2003-16816, the contents of which are hereby incorporated by reference.

BACKGROUND OF THE INVENTION

1. Field of the Invention

The present invention relates to a mobile communication terminal, and more particularly to a mobile communication terminal having a camera.

2. Description of the Related Art

Presently, mobile communication terminals have been equipped with a high-speed data transmitting function as well as a voice communication function. For example, if an IMT-2000 mobile communication network is realized, high-speed data communication as well as voice communication will be attained by using a mobile communication terminal. In addition, a camera or a TV receiver can be added to the mobile communication terminal to display a moving picture. A mobile communication terminal equipped with the camera can display the moving picture and a still picture by taking a photograph of an object, and can also transmit a photographed image to other mobile communication terminals.

However, when taking a photograph by using the camera of the mobile communication terminal, a user must manually push a button on the camera body to activate a camera shutter. Therefore, if a user wants to take a photograph of himself/herself by using the camera of the mobile communication terminal, the user will have to stretch and extend his/her hand that is gripping the mobile communication terminal to a proper camera range and push the camera shutter activation button. Accordingly, although the user can take a photograph of his or her face or other body part, it is impossible to photograph the user's entire body when the user takes a photograph of himself/herself using the camera of the mobile communication terminal.

SUMMARY OF THE INVENTION

Accordingly, the present invention has been made to solve the above-mentioned problems occurring in the prior art, and an object of the present invention is to provide a mobile communication terminal capable of taking a photograph by using a remote-controlled camera equipped therein and a photographing method by using the same.

In order to accomplish this object, there is provided a method for taking a photograph by using a mobile communication terminal having a camera. The method comprises the steps of inputting a remote-control photographing mode of the camera, receiving a predetermined call, determining whether or not a telephone number of the predetermined call corresponds to a telephone number stored in a memory, and operating the camera to take a photograph when the telephone number of the predetermined call corresponds to the telephone number stored in the memory.

According to another aspect of the present invention, in order to accomplish the above object, there is provided a mobile communication terminal having a camera. The mobile communication terminal comprises a storing section for storing telephone numbers assigned to remote-control the camera, and a control section for operating the camera to take a photograph when a remote-control photographing mode is selected if a telephone number of a call received in the mobile communication terminal matches with the telephone number assigned to remote-control the camera.

BRIEF DESCRIPTION OF THE DRAWINGS

The above object and other features and advantages of the present invention will be more apparent from the following detailed description taken in conjunction with the accompanying drawings, in which.

DETAILED DESCRIPTION OF THE PREFERRED EMBODIMENTS

Figure 1:
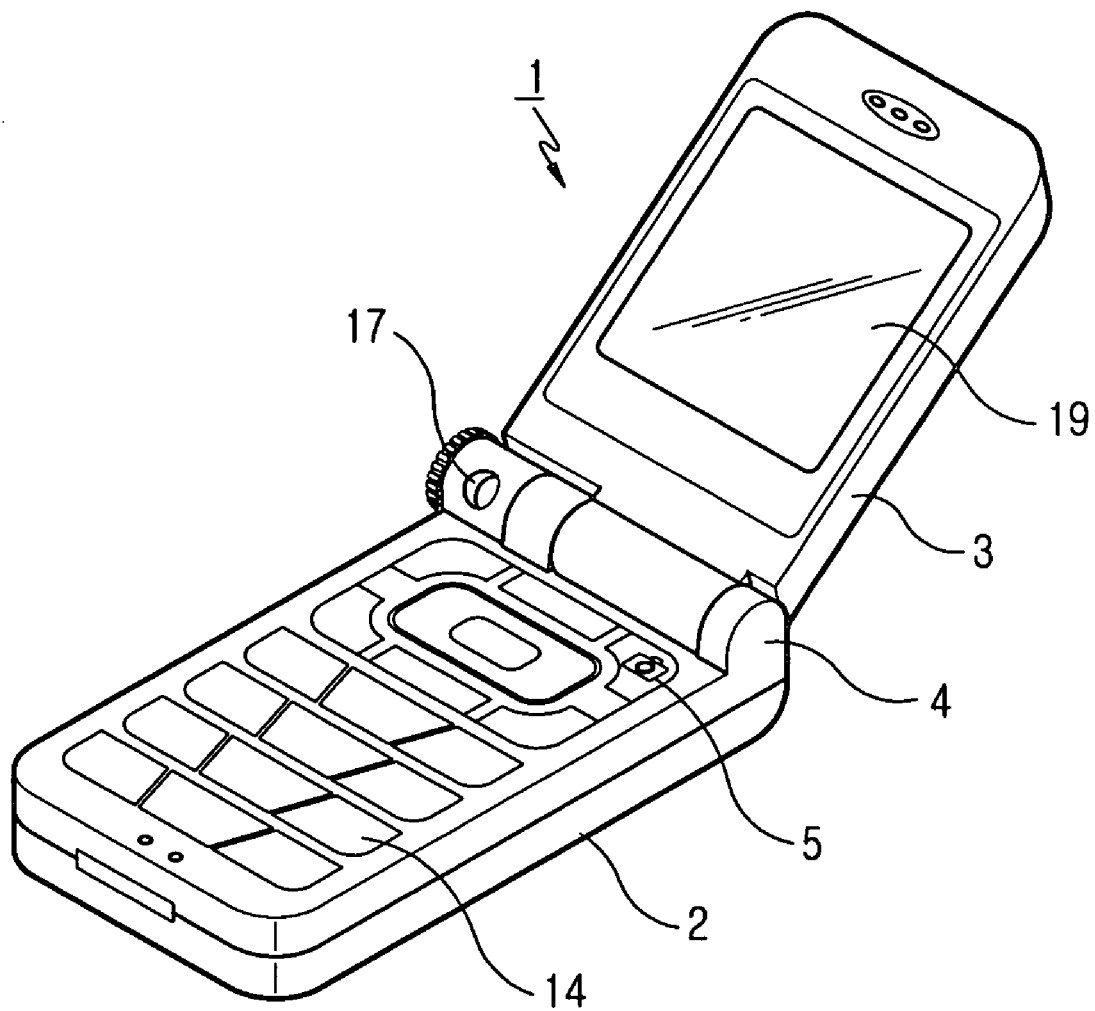
FIG. 1 is a perspective view showing a mobile communication terminal according to one embodiment of the present invention.

Hereinafter, preferred embodiments of the present invention will be described with reference to the accompanying drawings. In the following description of the present invention, the same reference numerals are used to designate the same or similar components. A detailed description of known functions and configurations is omitted to avoid making the subject matter of the present invention unclear.

FIG. 1 is a perspective view showing a mobile communication terminal 1 according to one embodiment of the present invention. As shown in FIG. 1, the mobile communication terminal 1 mainly includes a body 2 having a key input section 14, a folder 3 equipped with a display section 19, a rotation hinge section 4 for connecting the body 2 to the folder 3, and a camera module 17 installed in the rotation hinge section 4. According to the present invention, the key input section 14 includes a camera remote-control key 5 for selecting a remote-controlled photographing mode of the camera module 17.

Figure 2:
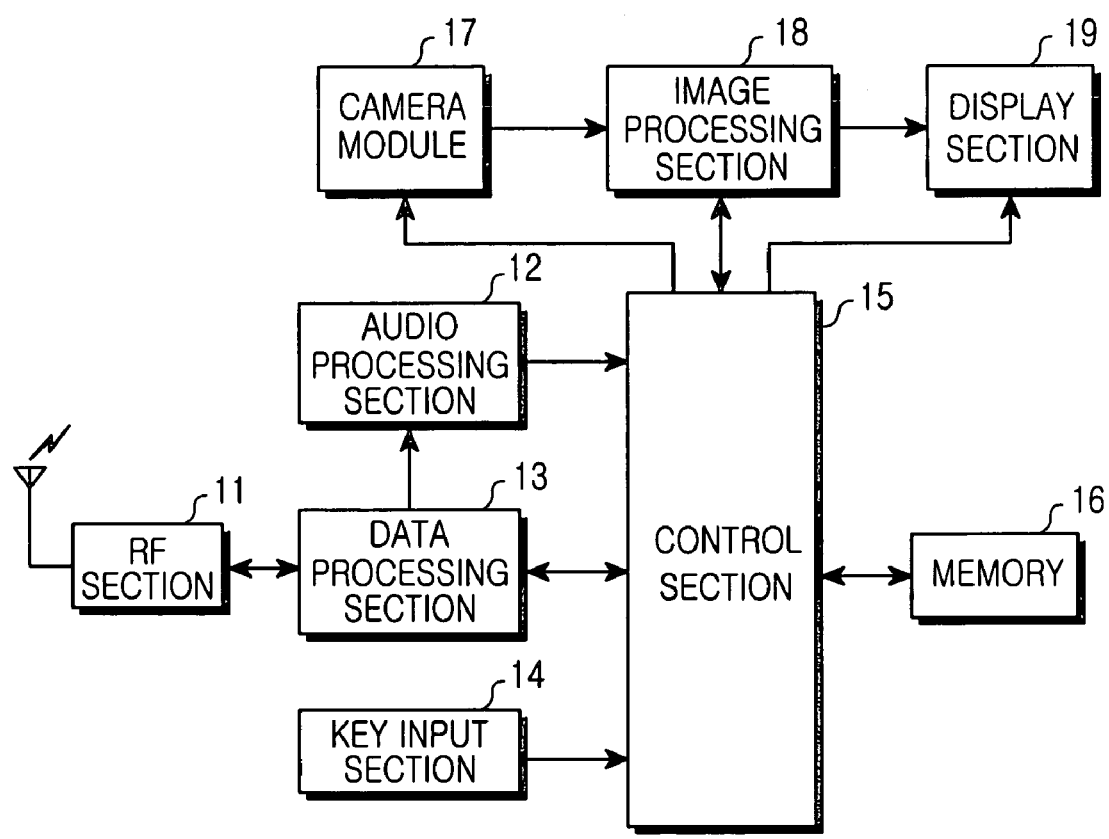
FIG. 2 is a block diagram showing various components of the mobile communication terminal shown in FIG. 1.

FIG. 2 is a block view showing an internal structure of the mobile communication terminal 1 shown in FIG. 1. As shown in FIG. 2, the mobile communication terminal 1 has an RF section 11 for receiving/transmitting a wireless signal through an antenna, a data processing section 13 connected to the RF section 11 so as to process voice signals or data signals transmitted from the RF section 11, an audio processing section 12 for processing voice signals outputted from the data processing section 13, a memory 16, the camera module 17, an image processing section 18 for processing image signals of the camera module 17, the display section 19 for displaying the image signal outputted from the image processing section 18, and a control section 15 for controlling the operation of the mobile communication terminal 1.

The RF section 11 performs a wireless communication function of the mobile communication terminal 1. The RF section 11 includes an RF transmitter for increasing and amplifying frequencies of transmitted signals, and an RF receiver for lowering and low-noise amplifying frequencies of the received signals. The data processing section 13 has a modulator for coding and modulating transmitted signals and a demodulator for decoding and demodulating received signals. That is, the data processing section 13 includes a MODEM and a CODEC. The CODEC has a data CODEC for processing packet data and an audio CODEC for processing audio signals, such as voice.

The camera module 17 photographs objects and is controlled by the control section 15, and outputs an image signal to the image processing section 18 of the photographed object.

The image processing section 18 generates screen data for displaying image signals generated from the camera module 17.

The display section 19 displays the image signal generated from the image processing section 18 on a screen and displays user data outputted from the control section 15. The display section 19 includes an LCD. When the LCD is formed as a touch screen, the display section 19 can be operated as an input section.

The memory 16 stores data generated from the mobile communication terminal 1, such as image data including short message service (SMS) data, still pictures and moving pictures. According to the present invention, at least one CID (caller ID) is stored in the memory 16 in order to photograph an object by remote-controlling the camera module 17. The CID means a telephone number of an outgoing telephone call.

The key input section 14 has keys for inputting numeric and character information and various functional keys for setting various functions. In addition, the key input section 14 is provided with the camera remote-control key 5 for selecting a remote-control mode of the camera module 17.

The control section 15 displays a remote-control setting screen 30 (shown in FIG. 3A) when the user inputs a signal by selecting the camera remote-control key 5.

Figure 3A:
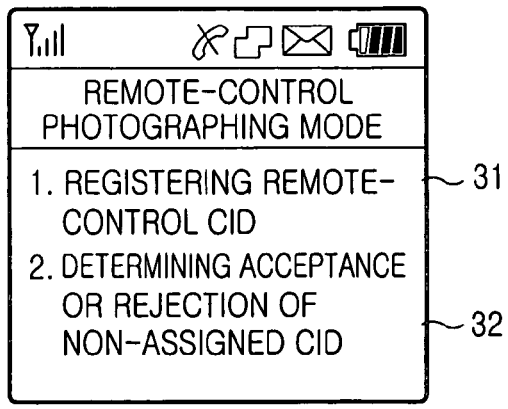
FIGS. 3A to 3D are views showing remote-control setting screens of the mobile communication terminal.

The remote-control setting screen 30 shown in FIG. 3A includes a first menu 31 for registering a remote-control CID, and a second menu 32 for determining acceptance or rejection of a non-assigned CID. If the user selects the first menu 31 for registering the CID, a CID registering and setting screen 40 is displayed in the display section 19 as shown in FIG. 3B.

Figure 3B:
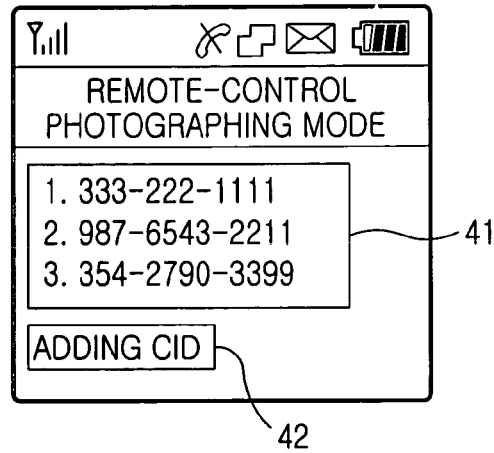
Figure 3C:
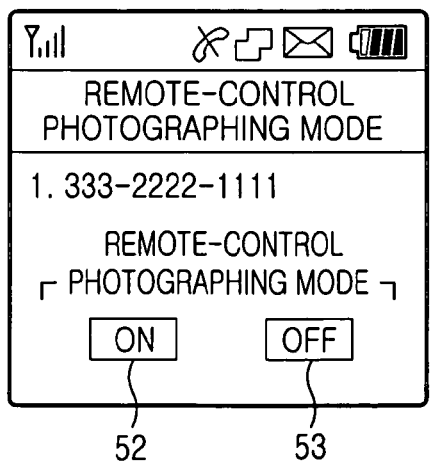

Referring to FIG. 3B, the CID registering and setting screen 40 includes a CID list 41 representing registered CIDs, and a CID adding icon 42 for adding CIDs. When the user inputs a new CID through the key input section 14 after selecting the CID adding icon 42, the control section 15 stores the new CID in the memory 16. Then, if the user selects a certain CID in the CID list 41 of the CID registering and setting screen 40, a CID selecting screen 50 is provided, requesting the user to use the selected CID and displaying the selected CID in the display section as shown in FIG. 3C. The CID selecting screen 50 includes an on-icon 51 and an off-icon 52 for selecting "ON" or "OFF" of the camera module 17 when the selected CID is received in the mobile communication terminal 1.

On the other hand, if the user selects the second menu 32 in the remote-control setting screen 30 for determining acceptance or rejection of the non-assigned CID, a selection screen 60 is displayed in the display section 19 so that the user can select cut-off a call from the non-assigned CID, or can select release of the remote-control photographing mode to receive the call from the non-assigned CID.

Information selected by the user in the remote-control setting screen 30, CID registering and setting screen 40, CID selecting screen 50 and selection screen 60 is stored in the memory 16 by the control section 15. Thus, when a call having a CID assigned for the remote-control photographing is received in the mobile communication terminal 1, the control section 15 controls the camera module 17 in such a manner that the camera module 17 automatically takes a photograph.

Figure 4:
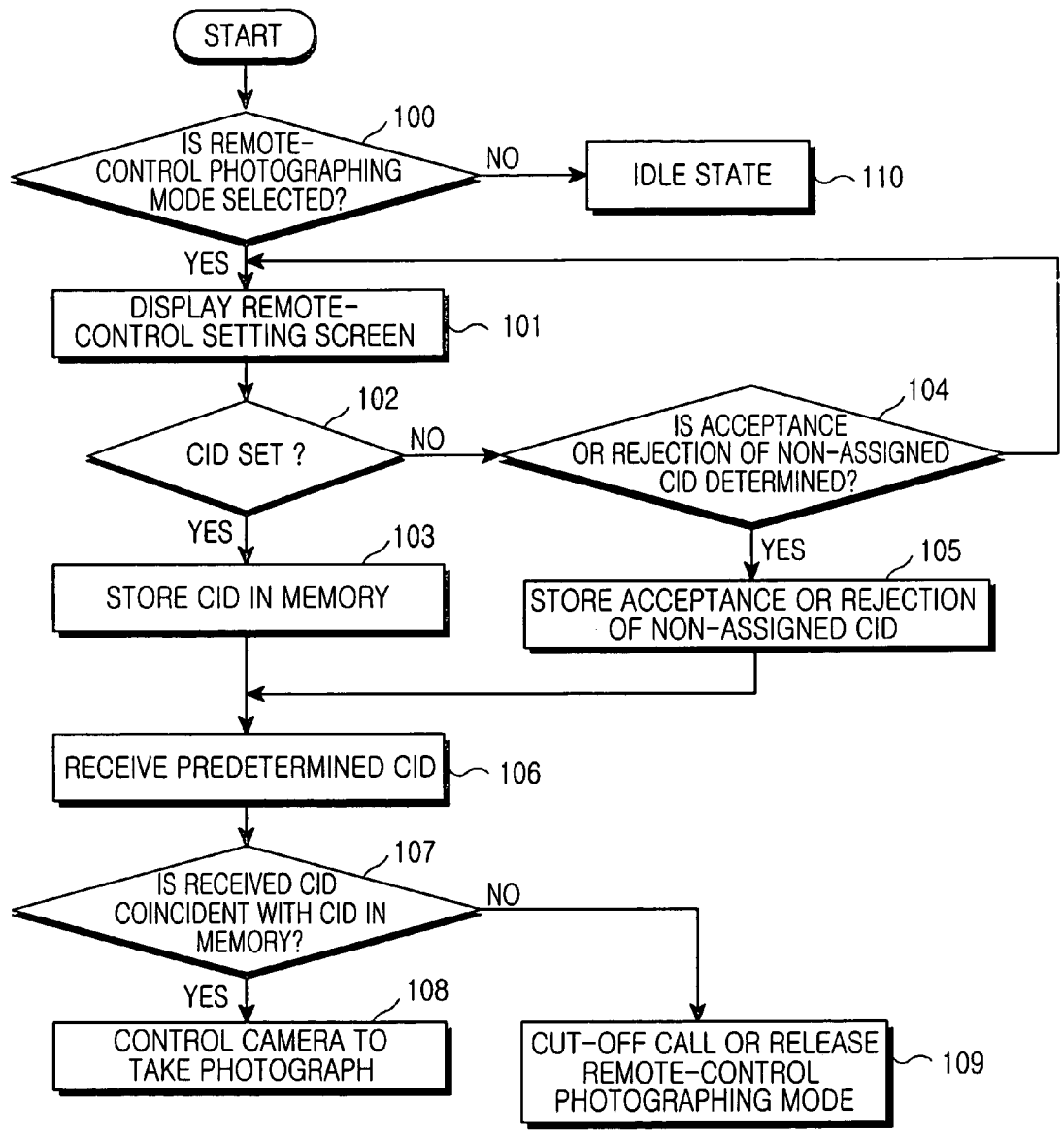
FIG. 4 is a flow chart showing a photographing method using a mobile communication terminal according to one embodiment of the present invention.

FIG. 4 is a flow chart showing a photographing method using the mobile communication terminal 1 according to one embodiment of the present invention. As shown in FIG. 4, if the user selects the camera remote-control key 5 of the key input section 14, the control section 15 enters the remote-control photographing mode (Step 100).

If the remote-control photographing mode is selected, the control section 15 causes the remote-control setting screen 30 to be displayed in the display section 19, as shown in FIG. 3A, for setting the CID or determining acceptance or rejection of the non-assigned CID (Step 101).

If the user selects the first menu 31 of the remote-control setting screen 30 for setting of the CID, the CID registering and setting screen 40, as shown in FIG. 3B, is displayed in the display section 19 so that the user inputs the CID assigned for remote-controlling the camera module 17 of the mobile communication terminal 1 (Step 102). Then, the control section 15 stores the CID inputted through the key input section 14 in the memory 16 (Step 103).

Figure 3D:
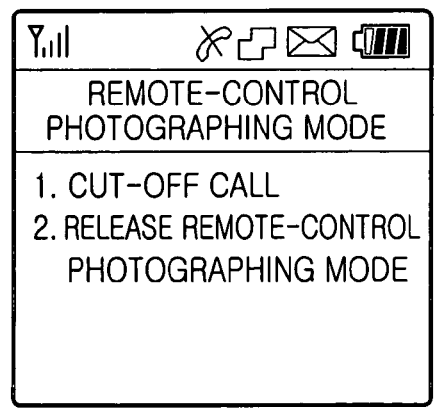

If the user selects the second menu 32 in the remote-control setting screen 30 for determining acceptance or rejection of the non-assigned CID (Step 104), the selection screen 60, as shown in FIG. 3D, is displayed in the display section 19. Acceptance or rejection of the non-assigned CID selected by the user is stored in the memory 16 (Step 105).

After setting the CID or determining acceptance or rejection of the non-assigned CID, a terminal 1 awaits receipt of a call generated from a predetermined mobile communication terminal, so that the mobile communication terminal 1 receives the call having a predetermined CID (Step 106).

At this time, the control section 15 detects the call having the predetermined CID and determines whether or not the predetermined CID contained in the incoming call exists in the memory 16 (Step 107). If the predetermined CID matches with the CID stored in the memory 16, the control section 108 operates a camera shutter to take a photograph (Step 108). If the predetermined CID is not coincident with the CID stored in the memory 16, the control section 15 checks acceptance or rejection of the non-assigned CID selected by the user in step 105.

If rejection of the non-assigned CID is selected by the user in step 105, the control section 15 cuts off the call having the non-assigned CID, and, if acceptance of the non-assigned CID is selected, the control section 15 releases the remote-control photographing mode of the camera module 17 so as to normally receive the call.

Accordingly, predetermined CIDs are stored in the memory of the mobile communication terminal having the camera module and the camera module is automatically operated when the call is received in the mobile communication terminal from a transmitter having the CID stored in the memory, so that the camera module can take a photograph without manually handling the camera module.

Although it is not described in the above embodiment in detail, the present invention can also use a call-back number included in a message of a SMS (short message service) as a CID for remote-controlling the camera module of the mobile communication terminal. That is, when the message of the SMS transmitted from a mobile communication terminal of a transmitter having an assigned CID is received in the mobile communication terminal or a receiver, the camera module is automatically operated.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for taking a photograph using a mobile communication terminal having a camera, the method comprising the steps of:
    entering a remote-control photographing mode;
    receiving a call having a caller ID (CID);
    determining whether the CID of the received call corresponds to a CID stored in a memory of the terminal;
    determining whether the received call should be accepted or rejected before alerting a user, when it is determined that the CID of the received call does not correspond to a CID stored in the memory of the terminal;
    releasing the remote-control photographing mode, based on results of the determination of whether the received call should be accepted or rejected; and
    operating the camera to take a photograph when the CID of the received call corresponds to the stored CID.

2. A method as claimed in claim 1, wherein the call includes a telephone number and a message of a short message service (SMS).

3. A method as claimed in claim 2, wherein a remote-control setting screen for inputting telephone numbers assigned to remote-control the camera is displayed upon entering the remote-control photographing mode.

4. A method as claimed in claim 3, wherein the remote-control setting screen includes a menu for determining acceptance or rejection of a call having a non-assigned telephone number.

5. A method as claimed in claim 4, wherein the SMS message is displayed on the menu for determining acceptance or rejection of the call having the non-assigned telephone number.

6. A method as claimed in claim 4, wherein a call-back number included in the SMS message is stored in the memory of the terminal for operating the camera to take a photograph.

7. A mobile communication terminal having a camera comprising:

a storing section for storing telephone numbers assigned to remote-control the camera; and a control section for:

operating the camera to take a photograph when a remote-control photographing mode is selected and a telephone number of a call received in the mobile communication terminal matches at least one of the telephone numbers assigned to remote-control the camera; and releasing the remote-control photographing mode, if when it is determined that the telephone number of a call received in the mobile communication terminal does not match at least one of the telephone numbers assigned to remote-control the camera and an acceptance setting was previously set.

8. A mobile communication terminal as claimed in claim 7, wherein the call includes a short message service (SMS) message.

* * * * *